United States Patent
Jaswal et al.

(10) Patent No.: US 8,568,817 B2
(45) Date of Patent: Oct. 29, 2013

(54) CREAM SUBSTITUTE

(75) Inventors: Varinder Singh Jaswal, Richmond Victoria (AU); Joanne Dixon, Cheltenham Victoria (AU)

(73) Assignee: Kraft Foods Group Brands LLC, Northfield, IL (US)

( * ) Notice: Subject to any disclaimer, the term of this patent is extended or adjusted under 35 U.S.C. 154(b) by 0 days.

(21) Appl. No.: 12/899,995

(22) Filed: Oct. 7, 2010

(65) Prior Publication Data

US 2011/0086156 A1 Apr. 14, 2011

(30) Foreign Application Priority Data

Oct. 9, 2009 (AU) ................................. 2009222635

(51) Int. Cl.
*A23C 13/14* (2006.01)
(52) U.S. Cl.
USPC .......................................... 426/586; 426/582
(58) Field of Classification Search
USPC .................................................. 426/582, 586
See application file for complete search history.

(56) References Cited

U.S. PATENT DOCUMENTS

| | | | |
|---|---|---|---|
| 3,929,892 A | | 12/1975 | Hynes et al. |
| 5,079,024 A | * | 1/1992 | Crane ............................ 426/573 |
| 5,252,352 A | * | 10/1993 | Banach et al. ................. 426/580 |
| 5,470,593 A | | 11/1995 | Meilinger et al. |
| 5,676,984 A | | 10/1997 | Bohanan et al. |
| 6,177,117 B1 | * | 1/2001 | Irvin .............................. 426/582 |
| 6,689,402 B1 | | 2/2004 | Nauth et al. |
| 2004/0047966 A1 | | 3/2004 | Hussein et al. |
| 2004/0247758 A1 | | 12/2004 | Hine et al. |
| 2005/0136168 A1 | | 6/2005 | Cha et al. |
| 2005/0214430 A1 | * | 9/2005 | Laye et al. .................... 426/582 |
| 2005/0249853 A1 | | 11/2005 | Merrill et al. |
| 2005/0249854 A1 | | 11/2005 | Merrill et al. |
| 2005/0271789 A1 | | 12/2005 | Merrill et al. |
| 2006/0034994 A1 | | 2/2006 | Abboud et al. |
| 2006/0182846 A1 | | 8/2006 | Trecker et al. |
| 2007/0065559 A1 | * | 3/2007 | Blindt et al. ................... 426/582 |
| 2008/0038438 A1 | | 2/2008 | Moore et al. |
| 2008/0038439 A1 | | 2/2008 | Moore et al. |
| 2008/0160133 A1 | * | 7/2008 | Brooks et al. ................... 426/36 |

FOREIGN PATENT DOCUMENTS

| | | |
|---|---|---|
| EP | 0483896 A1 | 5/1992 |
| EP | 0667104 A1 | 8/1995 |
| EP | 1006811 B1 | 6/2000 |
| EP | 1360905 A1 | 11/2003 |
| EP | 1579769 A1 | 9/2005 |
| EP | 1690456 A1 | 8/2006 |
| EP | 1982600 A1 | 10/2008 |
| GB | 2032241 A | 5/1980 |
| JP | 2000116349 A | 4/2000 |
| WO | 89/05587 A2 | 6/1989 |
| WO | 2004/021804 A1 | 3/2004 |
| WO | 2005/006887 A1 | 1/2005 |
| WO | 2006/012506 A1 | 2/2006 |

OTHER PUBLICATIONS

Texturizing and Stabilizing, by Gum! 2004. Prepared Foods Network. [Online]. Downloaded from <URL:http://www.preparedfoods.com/articles/print/104693>. 7 pages.*
Australian Examiner's Report, Australian Patent Application No. 2009222635, Oct. 19, 2010, 4 pages.
Australian Examiner's Report No. 2, Australian Patent Application No. 2009222635, Dec. 15, 2011, 2 pages.
Australian Examiner's Report No. 3, Australian Patent Application No. 2009222635, Apr. 26, 2012, 2 pages.
Bakker, N. H., "Manufacturing of Quarg", Antonie van Leeuwenhoek, pp. 83-84, vol. 49, No. 1, Jan. 1983.
New Zealand Examiner's Search Report, New Zealand Patent Application No. 588309, Oct. 4, 2010, 3 pages.
New Zealand Examiner's Search Report, New Zealand Patent Application No. 588309, Apr. 3, 2012, 2 pages.

* cited by examiner

*Primary Examiner* — Carolyn Paden
(74) *Attorney, Agent, or Firm* — Fitch, Even, Tabin & Flannery LLP

(57) ABSTRACT

Cream substitutes are described comprising: a cheese curd, a water source, and a combination of gums that provide the cream substitute the texture of a thick cream, and/or stability against oil separation. The gums may be locust bean gum and xanthan gum. The amount of cheese curd in the composition is typically not more than about 55% by weight of the total ingredients. There is also provided a process for the manufacture of a cream substitute, comprising: combining a cheese curd, a water source, and hydrated gums, to form a mixture, in which the amount of cheese curd is not more than about 55% by weight of the total ingredients, homogenising the mixture, and heating the mixture at a temperature and for a time sufficient to pasteurise the mixture to form a cream substitute.

20 Claims, 2 Drawing Sheets

CREAM SUBSTITUTE

CROSS-REFERENCE TO RELATED APPLICATION

This application claims priority from Australian Patent Application Number AU 2009222635, filed Oct. 9, 2009, which is hereby incorporated herein by reference in its entirety.

FIELD

The present application relates to a cream substitute suitable for use in the preparation of foods in place of full fat dairy cream, and to methods for the manufacture of the cream substitute. The cream substitute is particularly suited to use in cooking at elevated temperatures.

BACKGROUND

Natural dairy cream is used extensively in cooking a range of food products, including savoury dishes, such a creamy pasta sauce, and sweet dishes, such as cream-containing desserts.

Creams are available in a variety of physical forms. The consistency of dairy creams often correlates to their fat content, however this can be modified by added thickeners to some extent. At one end of the spectrum of consistency is regular "cream", otherwise referred to as "single cream" in the UK and Australia, or as "light" "table" or "coffee" cream in the USA. These creams have a thin, runny pourable consistency and typical fat contents of about 18% to 30% depending on the country. The next thicker consistency of cream types in the spectrum is referred to as "thickened cream" or "whipping cream" in Australia and the UK, or as "medium cream", "light whipping cream" or "whipping cream" in the USA. These thicker creams have a thicker but still pourable consistency, and have typical fat contents of about 30-36% for regular-fat level varieties, although low fat varieties containing added gums for thickness may have a lower fat content, such as 18%. At the upper end of the spectrum are the thick creams, which are known as "double creams" in Australia and the UK, or as "extra-heavy", "double", or "manufacturer's cream" in the USA. These creams have a consistency such that a spoonful of the cream falls as a dollop from the spoon. The cream cannot be poured in a constant stream. In contrast to this, a spoonful of cream cheese or a cream cheese-type spread will stick to the spoon and will only be dislodged as a lump if scraped off the spoon. Such creams of this consistency resulting in the formation of a dollop as the cream falls from a spoon is referred to herein as "thick cream".

Natural dairy creams have a number of disadvantages. These creams have a limited shelf-life, typically less than two weeks under refrigerated storage conditions. If these creams are thermally processed to increase the shelf life, this can adversely affect the properties of the cream, including sensory and organoleptic attributes including taste, mouthfeel, texture, colour and odour.

In addition, when subjected to heating to elevated temperatures typical in cooking, such as in the preparation of savoury cream-based sauces, the cream becomes runnier and fails to adhere to other food products being coated, resulting in flavour being lost from the food product itself as the creamy liquid pools at the bottom of the dish.

Further, under heating conditions, creams can separate. Even at room or refrigeration temperatures separation or syneresis can occur.

A further disadvantage of natural dairy creams is that creams of a thicker consistency tend to have a higher fat content. There is a public interest in reducing the fat content of ingredients used in cooking, although without loosing the taste and textural properties that come from the fat content.

A number of cream substitutes have been proposed previously. However, these cream substitutes are often designed to be dairy fat-free and/or contain vegetable fats and oils in place of the dairy fats or other dairy ingredients. This results in the cream substitute having a flavour and organoleptic properties that do not sufficiently closely approximate those of natural dairy cream. In addition, these substitutes do not address the other problems associated with dairy cream, such as stability in cooking, thickened consistency, and retaining good coating properties on food at elevated temperatures. Often these cream substitutes are designed to provide a cream replacement for whipping, which involves different properties to those desired for a cream substitute suitable for use in cooking applications.

Accordingly, it is desired to produce a cream substitute that addresses one or more of these deficiencies in natural dairy cream. It is also desired that the cream substitute be based on dairy ingredients, to retain a dairy-based flavour. It is also desired to develop a method for the preparation of a cream substitute that enables these desirable properties to be obtained.

SUMMARY

According to the present disclosure, there is provided a cream substitute based on a cheese curd component and water, and having a suitable gum combination to provide the texture of thick cream, and/or stability in cooking at elevated temperatures. The present disclosure also provides a method for the production of a cream substitute.

According to one embodiment, there is provided a cream substitute comprising:
 a cheese curd,
 a water source, and
 a combination of gums that provide the cream substitute the texture of a thick cream.

The combination of gums utilised in the product preferably provide stability during prolonged cooking at elevated temperatures. Thus, according to another embodiment, the present disclosure provides a cream substitute (or cooking cream) comprising:
 a cheese curd,
 a water source, and
 a combination of gums that provide the cream substitute stability against oil separation following simmering for a time of up to about 10 minutes.

Simmering occurs at a temperature between about 85 and about 95° C. Preferably, the cream substitute has stability against oil separation following simmering for a time of up to about 20 minutes.

Other properties of the cream substitute are a shelf-life of at least about 4 months, and typically at least about 6 months.

The desired consistency of the product and its cooking stability during simmering is contributed to by the relatively low levels of cheese curd present in the composition. The amount of cheese curd in the composition is typically not more than about 55% by weight of the total input ingredients, and in some embodiments is not more than about 50%.

One specific combination of gums that has been found to provide the consistency of a thick cream, and stability against oil separation during cooking is locust bean gum and xanthan gum. Thus, one embodiment provides a cream substitute comprising:
- a cheese curd in an amount of not more than 55% by weight,
- a water source,
- locust bean gum and
- xanthan gum.

The cream substitute is preferably vegetable-oil free. In other words, the cream substitute is a dairy-based cream substitute. Optional additional ingredients for inclusion in the product include one or more of the following:
- one or more additional gums or texturising agents (other than the locust bean gum and xanthan gum),
- one or more emulsifiers,
- one or more mouth coating agents,
- one or more thickening agents, and
- one or more fat sources (such as a dairy fat source).

Additional desired ingredients may include one or more milk solids, liquid dairy ingredients, flavours, preservatives, bulking agents or fillers and acidity regulators.

According to one embodiment, there is also provided a process for the manufacture of a cream substitute, comprising:
- combining a cheese curd, a water source, and hydrated gums, to form a mixture, in which the amount of cheese curd is not more than about 55% by weight of the total ingredients,
- homogenising the mixture, and
- heating the mixture at a temperature and for a time sufficient to pasteurise the mixture to form a cream substitute.

The mixture generally requires heating and mixing at a temperature and for a time sufficient to ensure that the active ingredients, including the gums, have functionalised to develop the desired textural and stability properties.

Homogenising and pasteurising can be performed in any order.

Preferred ingredients to be combined in the process are as identified above for the cream substitute product. Thus, the hydrated gums suitably comprise hydrated locust bean gum and hydrated xanthan gum. Details of the options for hydrating these gums are outlined in further detail below.

DETAILED DESCRIPTION

The present disclosure relates to a cream substitute that is suitable for use as a natural dairy cream substitute, and provides advantages over natural dairy cream. Some of those advantages may be stability during cooking at elevated temperatures for prolonged periods of time, the consistency of a thick cream, and the ability to maintain a good coating on food products. Another advantage of the product is a longer shelf life compared to natural dairy cream. The cream substitute is dairy based, and in various embodiments is free of vegetable fats and oils. Accordingly, the flavour and organoleptic properties fairly closely approximate those of natural dairy cream. The product also avoids an excessively acidic "cheese" flavour, of the type that may be present in cheese spreads such as cream cheese spreads.

The term "cheese substitute" is used broadly to refer to a product suitable for use as a substitute for cream. The cheese substitute is preferably a product suitable for use as a substitute for cream in cooking at elevated temperatures, and may therefore be referred to as a cooking cream.

Cheese Curd

The cream substitutes of the present disclosure comprise a cheese curd. The term "cheese curd" refers to the curd of unripened cheese or fresh cheese, examples of which include cream cheese, quarg, cottage cheese, and any other soft white cheese. This class of cheese excludes rennet ripened cheeses and long-life cheeses such as cheddar cheese. Such unripened cheeses are typically produced through the acidification of a dairy product such as cream and/or milk, and collection of the curd separated from the whey in the coagulum so produced. The acidification may come about through culturing with a suitable culture, such as a lactic acid-producing bacteria. Although such cheeses are unripend (and thus are not subjected to a proteolytic ripening process with rennet), small amounts of rennet can be added during the production of these types of cheeses to function as a curd firmer. The reference to "curd" indicates that the cheese may be used in the form of the collected curd following separation of the whey, however it will be appreciated that the cheese curd may be used or present in a combination with other components or ingredients, including, without limitation, whey.

According to one embodiment, the cheese curd may be selected from one or more of cream cheese, cottage cheese, quarg and any other soft white cheese. The cheese curd may be selected from one or more of cream cheese, cottage cheese and quarg. According to some embodiments, the cheese curd is selected from one or a combination of cream cheese and quarg.

Cream cheese, cottage cheese, quarg and soft white cheeses are well known types of cheese in the dairy industry. Cream cheese is a rich unripened cheese produced from the culturing milk and cream, which provides a higher dairy-fat content in the final product. Quarg, otherwise known as "quark" or "baker's cheese" in some countries, is made by a similar process using low-fat milk or skim-milk, and this produces a lower fat fresh cheese curd product. Cottage cheese is made in a similar process to quarg, and also utilises low- or non-fat milk as the starting material.

The amount of cheese curd in the product is determined based on a combination of the following factors:
- the need to obtain the required protein range; too high a protein level in the product results in a product that is too thick and "binding"
- the need to obtain the desired fat level for the product—it is generally desired for the fat level to be below the levels traditionally associated with "regular" and "low fat" creams, for the cream-substitute equivalents;
- the identity of the specific cheese curd product to be used (which is also based on the above factors).

Natural dairy creams of a "regular fat" content typically contain a fat content of around about 35% (such as about 30-40%). In a cream substitute for a "regular fat" level cream, it is desired for the fat content to be around about 30% under this level, so the target fat content, which is contributed to in whole or in part by the cheese curd, is desirably in the range of about 18% to about 28%, such as about 20% to about 28%, or about 22% to about 27%, and generally at around a target level of about 25%. As described in further detail below with reference to optional additional ingredients, some of the fat content may also be contributed to by dairy fat-containing ingredients, including cream.

Natural dairy creams of "low fat" content typically contain a fat content of around about 18% (such as about 12-25%). In a cream substitute for a "low fat" level cream, it is desired for the fat content to be around about 30% under this level, so the target fat content, which is contributed to in whole or in part by the cheese curd, is desirably in the range of about 8% to about 18%, such as about 10% to about 16%, or about 10% to about 14%, and generally at around a target level of about 12%. For such low fat cream substitutes, it is generally desired for most or all of the fat content of the final product to come from the cheese curd.

To achieve these fat levels (and the desired protein levels), for a cream substitute for regular fat cream, the cream substitute may comprise a combination of about 25% to about 55% cheese curd, preferably between about 25% and about 45% cheese curd (noting that the total fat in the product may be contributed to by other ingredients in the product). According to one embodiment, the cream cheese substitute comprises between about 5% and about 25% cream cheese, and between about 5% and about 25% quarg or cottage cheese (preferably quarg). According to one specific embodiment, the cream cheese substitute comprises between about 5% and about 15% cream cheese, and between about 15% and about 25% quarg.

To achieve these fat levels (and the desired protein levels), for a cream substitute for light fat cream, the cream substitute may comprise a combination of about 25% to about 55% cheese curd. According to one embodiment, the cream cheese substitute comprises between about 15% and about 50% cream cheese, and between about 5% and about 25% quarg or cottage cheese (preferably quarg). According to one specific embodiment, the cream cheese substitute comprises between about 25% and about 45% cream cheese, and between about 5% and about 15% quarg.

All percentages herein are to be read as being references to percentages by weight. It is noted that when considering the amount of cheese curd in the cream substitute, the percentage amounts are measured as a percentage by weight of the total ingredients used in the production of the cheese substitute during manufacture.

The cheese curds used in the production of the cream substitute typically have a significant moisture content. The moisture content is generally within the range of about 50-90%. As one example, quarg has a moisture content of around about 80-90% (such as about 85%). Typical protein contents for quarg are around about 6-12% (such as about 9.4%), casein contents are typically around about 8.70%, and fat contents are typically very low at around less than about 2% (such as about 0.17%). As another example, cream cheese curd has a moisture content of around about 50-65% (such as about 54.5%). Typical protein contents for cream cheese curd are around about 5-10% (such as about 7.4%), casein contents are typically around about 6.8% and fat contents are typically higher at around about 20-40% (such as about 34%). When assessing the weight of cheese curd in the product, the moisture content naturally present in the cheese curd is included in the measurement. It follows that a significant amount of the cheese curd component is moisture, particularly when a high-moisture content cheese curd is used, such as quarg. This contributes to the texture of the final product.

It is desired, for both regular-fat and low-fat varieties, that the protein level of the product be around about 2-6%. The level is preferably about 2-5% for a light fat cream substitute, and about 2-6% for a regular fat cream substitute. The preferred protein content range for each is about 3.5 to about 4.5%.

Target and typical values for protein levels, casein levels, moisture content and fat content for a light fat cream substitute, and a regular fat cream substitute of some embodiments are outlined below (all measured as % by weight):

| | Target Protein Level (%) | Typical Casein level (%) | Typical range for protein (%) | Target Moisture content (%) | Typical Fat content (%) |
|---|---|---|---|---|---|
| Light | 3.6 | 3.2 | 2-5 | 72.3 | 12.0 |
| Regular | 4.0 | 3.5 | 2-6 | 66.7 | 23.1 |

Water Source

The cream substitutes of the present disclosure include water, which may be provided in the composition from any source. Water may come from the water content present in the cheese curd component, such as quarg, or may be provided as water per se. The total moisture content of the product may be around about 60-78%. For a regular fat cream substitute, the moisture content may be around about 60% to about 72%, such as about 62% to about 70%, or about 66% (+/−2%). For a light fat cream substitute, the moisture content may be around about 66% to about 78%, such as about 68% to about 76%, or about 72% (+/−2%).

The gums present in the composition are selected to provide the desired properties of the cream substitute, such as cooking stability and/or texture.

Suitable gums include, in particular, a combination of locust bean gum and xanthan gum. This specific gum combination has been found through extensive test work to provide the required textural and stability properties for the cream substitute.

Locust bean gum (LBG) provides the properties of holding the matrix together, and provides texturising properties and a creamy mouthfeel.

During manufacture of the product, it is desired for the locust bean gum to be hydrated (and not "undercooked") to provide functionality. Hydration typically takes up to about 10 minutes, although longer hydration times can be used. Hydration may be carried out in-situ in the manufacturing process, or as a preliminary hydration step, with the hydrated gum optionally being held in a separate tank in a pre-hydrated state ready for use. Hydration may be carried out with water or a water source at an elevated temperature—around 65° C. is typical, to assist in hydration. There should be sufficient free water for full hydration. In view of the high water content of quarg, if quarg is used as the or one of the cheese curd materials, the water content in the quarg can be used in hydration of this gum (or any other gums present in the composition).

The amount of locust bean gum in the cream substitute is suitably between about 0.05% and about 0.2%. For a regular fat cream substitute, the level is suitably between about 0.06% to about 0.18%, and typically around about 0.08-0.12%. As one example, the level may be around about 0.096% (+/−0.01%). For a light fat cream substitute, the level is suitably between about 0.05% to about 0.15%, such as about 0.06% to about 0.12%, and typically around about 0.06-0.09%. As one example, the level may be around about 0.072% (+/−0.01%).

Xanthan gum provides binding properties, and keeps the solids suspended in the cream substitute without binding so strongly as to make too solid a product. Other gums investigated in place of xanthan gum did not provide equivalent properties to the xanthan, especially in combination with locust bean gum.

During manufacture of the product, the xanthan gum should also be hydrated (and not "undercooked") to provide functionality. The details regarding hydration of the locust bean gum above, including details of the hydration time, water source, temperature, in-situ or pre-hydration, apply equally to the xanthan gum.

The amount of xanthan gum in the cream substitute is suitably between about 0.005% and about 0.08%. For a regular fat cream substitute, the level is suitably between about 0.005% to about 0.08%, such as about 0.01% to about 0.05%, and typically around about 0.01-0.04%. As one example, the level may be around about 0.024% (+/−0.005%). For a light fat cream substitute, the level is suitably between about 0.005% to about 0.05%, such as about 0.008% to about 0.04%, and typically around about 0.01-0.03%. As one example, the level may be around about 0.018% (+/−0.005%).

The relative amount of locust bean gum to xanthan gum in the cream substitute is suitably between about 60:40 and about 95:5; in other cases between about 70:30 and about 90:10, and typically within the range of about 75:25 to about 85:25. A ratio of about 80:20 is one example.

According to one embodiment, the locust bean gum and the xanthan gum are combined with the cheese curd following completion of any culturing or acidification to produce the cheese curd. It is desired that the cheese curd used in the manufacture of the product does not contain gums that were added prior to culturing or acidification, as this may adversely affect the viscosity of the final product.

Other Gums

Whilst locust bean gum and xanthan gum have been found to provide the most suitable properties for the cream substitute, other gums or gum combinations may be found that provide the properties desired in the cream substitute in place of the locust bean gum and xanthan gum combination. Other gums that may be considered in this context include one or more gums selected from locust bean gum, xanthan gum, carragenan, guar gum, cellulose-based gums, including carboxy methyl celluloses (CMC, including all salts thereof such as sodium carboxy methyl cellulose), hydroxypropyl methyl cellulose and hydroxypropyl cellulose, alginates, including alginate salts such as sodium alginate, pectins of all types, agar, arabinogalactab or larch gum, tragacanth gum, gum arabic or acacia, gellan gum and karaya gum, or mixtures thereof.

Other Ingredients

Optional additional ingredients for inclusion in the product include one or more of the following:
one or more additional gums or texturising agents (other than the locust bean gum and xanthan gum),
one or more emulsifiers,
one or more mouth coating agents,
one or more thickening agents, and
one or more fat sources (such as a dairy fat source).

Additional desired ingredients may include one or more milk solids, flavours, preservatives, bulking agents or fillers and acidity regulators.

Texturising Agents

The cream substitute of some embodiments may comprise one or more additional gums or texturising agents (other than the locust bean gum and xanthan gum). These may be selected from the list of gums listed above, or from other texturising agents known in the art, including gelatine.

Some of the locust bean gum can be substituted with guar gum as an additional gum/texturising agent.

One example of a suitable texturising agent for inclusion in the cream substitute is gelatine. Gelatine is a texturising agent and provides a more gelled-texture to the product through its gelling properties. The gelatine assists in providing a more spoonable or "short" texture, so that the cream substitute falls as a dollop from a spoon or container, without a long gummy tail. Gelatine may be present in an amount of about 0-3% of the cream substitute. When present, it may be present at a level of about 0.05-3% of the cream substitute. For both regular fat and light fat cream substitutes, the level is suitably between about 0.05-1%, such as around about 0.08% to about 0.5%. In a regular fat cream substitute, the level may be around about 0.1% (+/−0.05%), and in the light fat cream substitute, the level may be around about 0.15% (+/−0.05%).

One example of a suitable additional gum/texturising agent is carboxymethylcellulose. Carboxymethylcellulose may be present in an amount of about 0-3% of the cream substitute. When present, it may be present at a level of about 0.05-3% of the cream substitute. For both regular fat and light fat cream substitutes, the level is suitably between about 0.05-1%, such as around about 0.08% to about 0.5%. As one example, the level may be around about 0.15% (+/−0.05%). The level is suitably chosen so as not to impart a slimy texture to the cream substitute. This agent also provides mouth-feel properties.

Emulsifiers

The cream substitute of some embodiments may comprise one or more emulsifiers. The emulsifier may be selected from one or more of the mono- and di-glycerides of fatty acids, acetic and fatty acid esters of glycerol, lactic and fatty acid esters of glycerol, citric acid esters, citric and fatty acid esters of glycerol, diacetyltartaric and fatty acid esters of glycerol, polyglycerol esters of fatty acids, mixed tartaric, acetic and fatty acid esters of glycerol, sucrose esters of fatty acids, propylene glycol esters of fatty acids, sorbitan monostearate, sorbitan tristearate, polyoxy sorbitan esters, polysorbates (such as polysorbate 80, 60 or 65) and lecithins.

As one example, the emulsifier may comprise a diacetyltartaric and fatty acid ester of glycerol. One example of this type of emulsifier is sold under the trade mark Panodan. This agent aids in preventing oil separation at elevated cooking temperatures.

The amount of emulsifier should be chosen to provide suitable emulsion properties, without being present at so high a level as to impart an adverse flavour on the cream substitute. As a guide, the emulsifier level may be from about 0% to 0.3%, and suitably about 0.05-0.3% when present. The level is preferably not more than about 0.2%. Suitable levels for inclusion in a regular fat cream substitute are about 0.05-0.2%, such as about 0.15% (+/−0.03). Suitable levels for inclusion in a low fat cream substitute are about 0.05-0.25%, such as about 0.05-0.5%, and around about 0.114% (+/−0.03).

Regarding the process of manufacture, the emulsifier should be incorporated at a time when the temperature is sufficiently high, such as at least about 60° C., or around about 65° C. It is therefore appropriate to add the emulsifier as the last, or one of the last ingredients during manufacture, but prior to pasteurisation and homogenisation. This applies particularly for fat-based or triglyceride-based emulsifiers such as diacetyltartaric and fatty acid esters of glycerol. This enables the emulsifier to functionalise and exert its emulsifying effect immediately on addition.

Mouth Coating Agents

Mouth coating agents may be selected from the list of gums listed above. Some gums provide texturising properties, and mouth-coating properties. An example of an agent providing this effect is CMC.

Thickening Agents

Suitable thickening agents include all variety of starches, including modified or functional starches. Amongst the range of thickening agents that may be considered are distarch phosphate, phosphated distarch phosphate, acetylated distarch phosphate, starch acetate esterified with acetic anhydride, hydroxypopyl starch, hydroxypropyl distarch phosphate and starch sodium octenylsuccinate. One example of a suitable starch for use as a thickening agent in the cream substitute is starch sodium octenylsuccinate, which is referred to as "Modified Waxy Maize N-Creamer" in the Examples.

The starch may be present in an amount of about 0-1.5% of the cream substitute. When present, it may be present at a level of about 0.2-1.5% of the cream substitute. For both regular fat and light fat cream substitutes, the level is suitably between about 0.5-1.0%. As one example, a regular fat cream substitute may comprise about 0.7% starch (+/−0.1%), and a light fat cream substitute may comprise about 0.8% starch (+/−0.1%).

Fat Sources

The cream substitute of some embodiments may comprise a fat source. This fat source is other than (i.e., additional to) the cheese curd, which provides a certain fat level to the cream substitute. The inclusion of an additional fat source is particularly suited for a regular fat cream substitute, where the total fat level for the product allows for the incorporation of some fat to increase the fat level, and provide creamy flavour and mouthfeel. The fat source is preferably a dairy fat source, and is preferably cream. Other dairy fat sources available include concentrated milk fat or anhydrous milk fat. The fat content of the cream may be in the range of about 18% to about 80%, or about 30% to about 60%, and is suitably in the range of about 30% to about 45%, such as around about 35-42% fat content.

In the low fat cream substitute, the cream substitute is preferably free of any fat source other than the cheese curd. In the regular fat cream substitute, the fat source is preferably cream, and the fat source is preferably added in an amount of between about 0% and about 60% by weight, preferably about 0-50% by weight, such as about 10-50% by weight, about 20-50% by weight, or about 30-50% by weight of the cream substitute.

Additional Ingredients

The cream substitute of some embodiments may comprise one or more additional ingredients. Suitable ingredients include milk solids and liquid dairy ingredients (such as whey protein concentrates, skim milk powder, non-fat dry milk (NFDM), milk protein concentrate, casein, liquid whey protein concentrate, whey protein isolate, liquid or dried sweet whey, liquid or dried acid whey and the like, as well as mixtures thereof), flavours (such as salt, sweeteners, fruit flavours or fruits, vanilla, and the like), preservatives (of any known type, such as sorbic acid), bulking agents or fillers (such as maltodextrin and the like) and acidity regulators (such as food grade acids such as citric acid, and food grade alkalis, such as trisodium phosphate). The bulking agent content may be between about 0% and about 20% by weight.

Acidity regulators may be used when required to adjust the pH of the product to a desired level. A suitable target pH is in the range of about 4.5-5.0. As one example, the pH target may be about 4.7. If the pH is below the target value, an alkali may be used to raise the pH, or if the pH is above the target value, an acid may be used to lower the pH.

Vegetable-Oil Free

The cream substitute is preferably vegetable-oil free. In other words, the cream substitute is a dairy-based cream substitute. It is noted that some ingredients in the composition, such as emulsifiers, may be derived from vegetable oils, and therefore the term "vegetable-oil free" should be read as meaning the absence of vegetable oils in the oil form. Minor levels (below about 1%) of products derived from vegetable oils are to be excluded when considering compliance with this requirement. The term "vegetable-oil free" therefore means that the product contains less than about 1%, preferably less than about 0.5% vegetable oils or vegetable-oil derived ingredients. Preferably the product contains about 0% vegetable oil in oil form, and less than about 0.5% of any vegetable oil-derived ingredients.

Properties of Cream Substitute

The cream substitute suitably has cooking stability. Cooking stability refers to stability against oil separation (more extreme levels of oil separation leading to curdling and oiling-off) during heating, such as heating to a simmer, for a time of at least about 10 minutes. A typical simmer temperature is between about 85° C. and 95° C. The product preferably has stability against oil separation for a time of at least about 20 minutes. Generally stability against oil separation will be present for much longer time periods. In contrast, the oils/fats in standard cream will give rise to oil separation and curdling at about 10 minutes, and the degree of curdling will be considerable after about 20 minutes of simmering.

Traditional cream cheeses and cream cheese spreads will tend to fail this cooking stability test, through oil separation and possible browning or burning.

The cream substitute suitably has the consistency of thick cream. A "thick cream" is defined herein as being a cream having a consistency resulting in the formation of a dollop as the cream falls from a spoon. The dollop of cream is required to fall from the spoon under the action of gravity, and without scraping away from the spoon. Generally, the dollop of cream substitute will fall from the spoon in a dollop without a gummy or long tail trailing down from the spoon. This is also referred to as a "spoonable consistency". A thick cream also preferably has the property of leaving an impression when a spoonful is removed from a container of the cream, with a soft edge. This texture corresponds to creams known as "double creams" in Australia and the United Kingdom.

This consistency is distinguished from products having the consistency of cream cheese, or cream cheese spreads, in that a spoonful of such a cream cheese/spread does not drop under the action of gravity from a spoon, without scraping away the cheese/spread from the spoon. The viscosity of cream cheese/spread and the tackiness of the product prevents this from occurring, and the product sticks to the spoon.

A guide for assessing the consistency of the cream substitute can be provided by testing the product in a Brookfield viscosity analyser, and a Stevens texture analyser (to measure firmness).

In a Brookfield viscosity test, about a 600 gram hot sample of the product (at about 70° C.) is required to have a viscosity of between about 300-2500 cps, preferably about 300-1800 cps, when measured prior to homogenisation during manufacture, based on a setting of about 20 rpm speed and spindle 6. This test should be assessed in the commercial manufacture scale, since the bench scale results can provide different readings for a product of the same final consistency.

It is noted that cream cheeses and cream cheese spreads generally have a Brookfield viscosity of about 6,000-7,000 cps at this temperature. Thus, the consistency is quite different from the thick cream consistency of the cream substitute products disclosed herein.

In a Stevens texture test, the finished product at 5° C. is required to give a measurement of between about 60 g and about 200 g, using a cylindrical spindle of the type TA11 (about 25.4 mm diameter, about 35 mm long) at a spindle speed of about 1 mm/s and a spindle travel distance of about 10 mm. This test should be assessed in the commercial manufacture scale, since the bench scale results can provide different readings for a product of the same final consistency.

Other properties of the cream substitute are a shelf-life of at least about 4 months, and typically at least about 6 months.

"Shelf-life" refers to the period of time at which the product (such as the cream substitute) can be stored at a refrigerated temperature (about 1-4° C.) free from any food spoilage/contaminating microorganisms, and without developing objectionable sensory and functionality characteristics, such as an objectionable aroma, appearance, taste, consistency, mouthfeel, off-odour, off-flavour, brown colouring, clumping, ropy or slippery texture.

Process of Manufacture

In simple terms, the process for the manufacture of a cream substitute, comprises:
combining a cheese curd, a water source, and hydrated gums, to form a mixture, in which the amount of cheese curd is not more than about 55% by weight of the total ingredients,
homogenising the mixture, and
heating the mixture at a temperature and for a time sufficient to pasteurise the mixture to form a cream substitute.

According to one embodiment, the process comprises:
providing a cheese curd which is produced through culturing or acidification,
combining the cheese curd with a water source and hydrated locust bean gum and xanthan gum, at a time following the completion of culturing or acidification to produce the cheese curd to form a mixture, in which the amount of cheese curd is not more than about 55% by weight of the total ingredients,
homogenising the mixture, and
heating the mixture at a temperature and for a time sufficient to pasteurise the mixture to form a cream substitute.

Generally, the process does not include any culturing step other than culturing to produce the cheese curd.

The mixture generally requires heating and mixing at a temperature and for a time sufficient to functionalise the active ingredients, including the gums, and to develop the desired textural and stability properties. Thus, the process may comprise the step of:
heating and mixing the mixture at a temperature and for a time sufficient to ensure that the active ingredients, including the gums, have functionalised to develop the desired textural and stability properties.

The desired properties are those described previously, including one or more of the properties of: the texture of thick cream, the viscosity and Stevens texture properties, and the cooking stability.

Suitable temperatures and times for performing this step include temperatures of between about 40° C. and about 80° C., for a time period of between about 2 and about 40 minutes, with mixing. It is noted that the ingredients may be pre-heated (for instance, the gums can be hydrated with warm/hot water at around about 65° C.), so that the temperature may only require maintenance at the elevated level already provided by such pre-heating. Thus, the term "heating" is to be read broadly as encompassing pre-heating of ingredients and/or maintenance of an elevated temperature of ingredients, and/or the application of additional heat energy. It is generally anticipated that there will at least be a need to apply some heat energy to maintain or raise the temperature to a suitable level to develop the desired properties. Suitable temperatures are about 50-75° C., in some cases about 60-75° C., and the suitable time periods are about 5 to about 30 minutes, preferably about 10 to about 30 minutes.

The ingredients may be added slowly over the time period of mixing. The time period therefore includes the time during addition of the subject ingredients.

Homogenising and pasteurising can be performed in any order, and may be performed simultaneously.

The ingredients to be combined in the process are as identified above for the cream substitute product. Thus, the hydrated gums suitably comprise hydrated locust bean gum and hydrated xanthan gum. Some details regarding the process involved in hydrating these gums are outlined above. Other gums that may be present may or may not require hydrating.

Details of the relative amounts and forms of the ingredients to be included in the process of manufacture can be determined by reference to the detailed description of embodiments of the cream substitute product described above.

According to one embodiment, the process of manufacture comprises:
hydrating locust bean gum with water or a water source,
hydrating xanthan gum with water or a water source,
mixing the hydrated locust bean gum and hydrated xanthan gum with a cheese curd at an elevated temperature to form a mixture,
optionally adding an emulsifier to the mixture at an elevated temperature,
homogenising the mixture, and
heating the mixture at a temperature and for a time sufficient to pasteurise the mixture to form a cream substitute.

Depending on the desired cream substitute composition, the ingredients may be combined in an order that promotes the obtaining of the desired textural and stability properties. However, generally provided that the gums are fully hydrated, the order of their incorporation can be reversed. Accordingly, in the above embodiment, the order of hydrating of the gums and the location where the gums are hydrated is not of significance, and the steps should not be read as implying a particular order, except where the language indicates otherwise.

For one specific embodiment suited to the formation of a light fat cream substitute, the process comprises:
hydrating locust bean gum with water or a water source,
hydrating and combining xanthan gum with the hydrated locust bean gum to form a first combination,
combining the first combination with powdered ingredients other than emulsifier to form a second combination,
mixing the second combination with cheese curd at an elevated temperature to form a mixture,
optionally adding an acidity regulator to the mixture,
optionally adding an emulsifier to the mixture at an elevated temperature,
homogenising the mixture, and
heating the mixture at a temperature and for a time sufficient to pasteurise the mixture to form a cream substitute.

In this embodiment, the powdered ingredients (i.e., cream substitute ingredients that are in powdered form) may include one or more ingredients selected from an additional gum such as carboxymethylcellulose or similar, a texturising agent such as gelatin, a bulking agent such as maltodextrin, salt and preservative. According to one embodiment, the powdered ingredients combined with the first combination includes each of these ingredients. These ingredients may be added with water or a water source.

The cheese curd may comprise a single type of cheese curd, or a combination of two or more types of cheese curds, as described above in the context of the final product. For example, the cheese curd may comprise quarg and cream cheese curd. These may be added together, or in a number of stages, in which each stage may involve the addition of a single or combination of cheese curd types. When present, the emulsifier is preferably added as the last ingredient when the mixture is at a temperature of not less than about 60° C., preferably not less than about 65° C.

According to another embodiment suited to the formation of a regular fat cream substitute, the process comprises:
hydrating a first gum selected from locust bean gum and xanthan gum with water or a water source,
combining the hydrated first gum with a first cheese curd component,
combining the hydrated first gum and first cheese curd combination with a second gum which is the other of the locust bean gum and the xanthan gum, wherein the second gum is pre-hydrated or is hydrated in situ with the optional addition of water,
mixing the combination of hydrated gums and cheese curd with (i) a second cheese curd component and (ii) powdered ingredients other than emulsifier and acidity regulator, at an elevated temperature, to form a mixture,
optionally adding a dairy fat to the mixture;
optionally adding an acidity regulator to the mixture,
optionally adding an emulsifier to the mixture at an elevated temperature,
homogenising the mixture, and
heating the mixture at a temperature and for a time sufficient to pasteurise the mixture to form a cream substitute.

According to one embodiment, the first gum is locust bean gum, and the second gum is xanthan gum.

The first cheese curd may be of the same identity as the second cheese curd, or may be different. According to one embodiment, the first cheese curd comprises quarg, and the second cheese curd comprises quarg and cream cheese curd. In this embodiment, the mixing of the combination of hydrated gums and the first cheese curd with (i) a second cheese curd component and (ii) powdered ingredients other than emulsifier, can be conducted in a single stage or in a number of stages, in which each stage may involve the addition of ingredients (i) and (ii) in portions. Thus, in one example, a portion of the (i) second cheese curd component which is a quarg component, together with (ii) all of the powdered ingredients other than emulsifier are added in one stage, and in a second stage, a second portion of the (i) second cheese curd component which is cream cheese curd is mixed in to form the mixture. If a dairy fat is added to the mixture, this can be performed at any suitable time, such as during mixing of the second portion of the second cheese component. If an acidity regulator is added to the mixture, this can be performed at any suitable time, such as during mixing of the second portion of the second cheese component (and the dairy fat, if present). When present, the emulsifier is preferably added as the last ingredient when the mixture is at a temperature of not less than about 60° C., preferably not less than about 65° C.

In this embodiment, the powdered cream substitute ingredients may include one or more ingredients selected from an additional gum such as carboxymethylcellulose or similar, gelatin, a bulking agent such as maltodextrin, salt and preservative. According to one embodiment, the powdered cream substitute ingredients combined with the first combination includes each of these ingredients. These ingredients may be added with water or a water source (quarg being one example of a water source).

Food Products

Food products which may be prepared with the above described cream substitute include, for example, sauces, gravies, spreads, dips, dressings, fillings, toppings, desserts, and the like as well as combinations thereof. The cream substitute is particularly well-suited for preparing savoury sauces (e.g., a cream pasta sauce such as an Alfredo sauce) and desserts (e.g., Tiramisu) and can be used in a similar manner as conventional thick or heavy cream in such food applications. The cream substitute provides added convenience, stability and cooking improvements in the preparation of cream-based sauces and desserts, when used as a replacement for all or part of the conventional cream requirements of the sauce or dessert recipes.

In one embodiment, there is provided a dairy-based food product comprising the cream substitute. The food product preferably contains about 20 to about 80 weight percent of the cream substitute.

Embodiments

According to a first embodiment, there is provided a cream substitute comprising:
a cheese curd,
a water source, and
a combination of gums that provide the cream substitute the texture of a thick cream.

The cream substitute of the first embodiment, wherein the viscosity of a 600 gram hot sample of the product (at 70° C.) is between about 300-about 1800 cps, when measured prior to homogenisation during manufacture, based on settings of a 20 rpm speed and spindle 6.

The cream substitute of the first embodiment, wherein the texture of a 5° C. sample of the cream substitute is between about 60 and about 200 g, measured on a Stevens texture analyser using a cylindrical spindle TA11 (25.4 mm diameter, 35 mm length) at a spindle speed of 1 mm/s and a spindle travel distance of 10 mm.

According to a second embodiment, there is provided a cream substitute comprising:
a cheese curd,
a water source, and
a combination of gums that provide the cream substitute stability against oil separation following simmering for a time of about 10 minutes.

The cream substitute of the second embodiment, wherein the cream substitute has stability against oil separation following simmering for a time of about 20 minutes.

The cream substitute of the second embodiment, wherein the combination of gums comprises locust bean gum and xanthan gum.

According to a third embodiment, there is provided a cream substitute comprising:
a cheese curd,
a water source, and
locust bean gum and
xanthan gum.

The cream substitute of any of the first, second or third embodiments, wherein the cheese curd is selected from one or more of cream cheese, cottage cheese, quarg and soft white cheese.

The cream substitute of any of the first, second or third embodiments, wherein the cheese curd is selected from one or a combination of cream cheese and quarg.

The cream substitute of any of the first, second or third embodiments, wherein the content of cheese curd is about 25% to about 55% by weight of the cream substitute.

The cream substitute of any of the first, second or third embodiments, wherein the content of cheese curd is between about 25% and about 45% cheese curd.

The cream substitute of any of the first, second or third embodiments, wherein the cream substitute comprises between about 5% and about 25% cream cheese, and between about 5% and about 25% quarg.

The cream substitute of any of the first, second or third embodiments, wherein the fat content is between about 18% to about 28%, preferably wherein the fat content is between about 22% and about 27%.

The cream substitute of any of the first, second or third embodiments, wherein the cream substitute comprises between about 15% and about 50% cream cheese, and between about 5% and about 25% quarg.

The cream substitute of any of the first, second or third embodiments, wherein the fat content is in the range of about 8% to about 18%, preferably in the range of about 10% to about 14%.

The cream substitute of any of the first, second or third embodiments, wherein the protein content is in the range of about 2.0 to about 6%.

The cream substitute of any of the first, second or third embodiments, wherein the moisture content is in the range of about 60% to about 72%, preferably in the range of about 66% to about 78%.

The cream substitute of any of the first, second or third embodiments, wherein the locust bean gum content is between about 0.05 and about 0.2%.

The cream substitute of any of the first, second or third embodiments, wherein the xanthan gum content is between about 0.005 and about 0.08%.

The cream substitute of any of the first, second or third embodiments, wherein the relative amount of locust bean gum to xanthan gum is between about 75:25 and about 85:15.

The cream substitute of any of the first, second or third embodiments, comprising one or more ingredients selected from the group consisting of:
one or more additional gums or texturising agents,
one or more emulsifiers,
one or more mouth coating agents,
one or more thickening agents, and
one or more fat sources.

The cream substitute of any of the first, second or third embodiments, wherein the cream substitute comprises at least one of each of the following ingredients, in which each ingredient is of a separate identity:
a gum or texturising agent other than locust bean gum and xanthan gum,
an emulsifier,
a mouth coating agent, and
a thickening agent.

The cream substitute of any of the first, second or third embodiments, further comprising a dairy fat.

The cream substitute of any of the first, second or third embodiments, further comprising one or more ingredients selected from the group consisting of milk solids, liquid dairy ingredients, flavours, preservatives, bulking agents or fillers and acidity regulators.

The cream substitute of any of the first, second or third embodiments, comprising gelatine.

The cream substitute of any of the first, second or third embodiments, wherein the gelatine is present in an amount of about 0.05 to about 3% of the cream substitute.

The cream substitute of any of the first, second or third embodiments, comprising carboxymethylcellulose.

The cream substitute of any of the first, second or third embodiments, wherein the carboxymethylcellulose is present in an amount of about 0.05 to about 3% of the cream substitute.

The cream substitute of any of the first, second or third embodiments, comprising an emulsifier.

The cream substitute of any of the first, second or third embodiments, wherein the emulsifier is present in an amount of about 0.05 to about 3% of the cream substitute.

The cream substitute of any of the first, second or third embodiments, comprising a starch.

The cream substitute of any of the first, second or third embodiments, wherein the starch is present in an amount of about 0.2 to about 1.5% of the cream substitute.

The cream substitute of any of the first, second or third embodiments, further comprising a dairy fat source.

The cream substitute of any of the first, second or third embodiments, wherein the fat source is cream.

The cream substitute of any of the first, second or third embodiments, wherein the cream content is between about 10 and about 50% by weight.

The cream substitute of any of the first, second or third embodiments, wherein the cream substitute is free of any fat source other than the cheese curd.

The cream substitute of any of the first, second or third embodiments, wherein the cream substitute is vegetable-oil free.

According to a fourth embodiment, a process for the manufacture of a cream substitute is provided, comprising:
combining a cheese curd, a water source, and hydrated gums, to form a mixture, in which the amount of cheese curd is not more than about 55% by weight of the total ingredients,
homogenising the mixture, and
heating the mixture at a temperature and for a time sufficient to pasteurise the mixture to form a cream substitute.

The process of the fourth embodiment comprising the step of:
heating and mixing at a temperature and for a time sufficient to ensure that the active ingredients, including the gums, have functionalised to develop the desired textural and stability properties.

The process of the fourth embodiment, wherein the heating and mixing step is performed at a temperature and a time sufficient produce a cream substitute having the texture of a thick cream.

The process of the fourth embodiment, wherein the heating and mixing step is performed at a temperature and a time sufficient to produce a cream substitute in which the viscosity of a 600 gram hot sample of the product (at about 70° C.) is between about 300 to about 1800 cps, when measured prior to homogenisation, based on settings of a 20 rpm speed and spindle 6.

The process of the fourth embodiment, wherein the heating and mixing step is performed at a temperature and a time sufficient to produce a cream substitute having a texture at room temperature between about 60 and about 200 g, measured on a Stevens texture analyser using a cylindrical spindle at a spindle speed of 1 mm/s and a spindle travel distance of 10 mm.

The process of the fourth embodiment, wherein the heating and mixing step is performed at a temperature and a time sufficient to produce a cream substitute having a stability against oil separation following simmering for a time of about 10 minutes.

The process of the fourth embodiment, wherein the heating and mixing step comprises heating at a temperature of between about 40° C. and about 80° C., for a time period of between about 2 and about 40 minutes, with mixing.

The process of the fourth embodiment, wherein the hydrated gums comprise hydrated locust bean gum and hydrated xanthan gum.

The process of the fourth embodiment, wherein the process comprises:
hydrating locust bean gum with water or a water source,
hydrating xanthan gum with water or a water source,
mixing the hydrated locust bean gum and hydrated xanthan gum with a cheese curd at an elevated temperature to form a mixture,
optionally adding an emulsifier to the mixture at an elevated temperature,
homogenising the mixture, and
heating the mixture at a temperature and for a time sufficient to pasteurise the mixture to form a cream substitute.

The process of the fourth embodiment, wherein the process comprises:
hydrating locust bean gum with water or a water source,
hydrating and combining xanthan gum with the hydrated locust bean gum to form a first combination,
combining the first combination with powdered cream substitute ingredients other than emulsifier to form a second combination,
mixing the second combination with cheese curd at an elevated temperature to form a mixture,
optionally adding an acidity regulator to the mixture,
optionally adding an emulsifier to the mixture at an elevated temperature,
homogenising the mixture, and
heating the mixture at a temperature and for a time sufficient to pasteurise the mixture to form a cream substitute.

The process of the fourth embodiment, wherein the powdered cream substitute ingredients include one or more ingredients selected from the group consisting of: an additional gum, a texturising agent, a bulking agent, salt and preservative.

The process of the fourth embodiment, wherein the powdered cream substitute ingredients comprise an additional gum, a texturising agent, a bulking agent, salt and preservative, in which each ingredient is of a different identity, and is additional to the locust bean gum and xanthan gum.

The process of the fourth embodiment, wherein the cheese curd comprises quarg and cream cheese curd.

The process of the fourth embodiment, wherein the process comprises:
hydrating a first gum selected from locust bean gum and xanthan gum with water or a water source,
combining the hydrated first gum with a first cheese curd component,
combining the hydrated first gum and first cheese curd combination with a second gum which is the other of the locust bean gum and the xanthan gum, wherein the second gum is pre-hydrated or is hydrated in situ with the optional addition of water,
mixing the combination of hydrated gums and cheese curd with (i) a second cheese curd component and (ii) powdered ingredients other than emulsifier and acidity regulator, at an elevated temperature, to form a mixture,
optionally adding a dairy fat to the mixture;
optionally adding an acidity regulator to the mixture,
optionally adding an emulsifier to the mixture at an elevated temperature,
homogenising the mixture, and
heating the mixture at a temperature and for a time sufficient to pasteurise the mixture to form a cream substitute.

The process of the fourth embodiment, wherein the first cheese curd comprises quarg, and the second cheese curd comprises quarg and cream cheese curd.

The process of the fourth embodiment, wherein the mixing of the combination of hydrated gums and the first cheese curd with (i) a second cheese curd component and (ii) powdered ingredients other than emulsifier, is conducted in stages, including a first stage in which quarg and all of the powdered ingredients other than emulsifier are added and mixed in, and a second stage, in which cream cheese curd is added and mixed in.

The process of the fourth embodiment, wherein dairy fat is added to the mixture during mixing of the second portion of the second cheese component.

The process of the fourth embodiment, wherein emulsifier is added as the last ingredient when the mixture is at a temperature of not less than about 60° C., preferably not less than about 65° C.

A food product comprising the cream substitute of any of the first, second, and third embodiments or a food product comprising a cream substitute manufactured by the process of the fourth embodiment.

The following Examples describe and illustrate preferred embodiments of the processes and cream substitutes described herein, and foods incorporating the cream substitute. These Examples are intended to be merely illustrative and not limiting thereof in either scope or spirit. Those skilled in the art will readily understand that variations of the materials, conditions, and processes described in these examples can be used. Unless otherwise noted, all percentages are percentages by weight.

EXAMPLES

During the development of the desired cream substitutes, a number of techniques were used to assess the properties of the cream substitutes. Details of the test procedures are set out below.

Brookfield Viscosity Measurements. This test was used to measure the texture of the hot product (viscosity at about 70° C.). Speed—about 20 rpm, Spindle 6 used and sample of about 600 g. Ideal range about 300-1800 cps (pre-homogenised).

Stevens Texture Analyser. Firmness was used to analyse the finished product texture. Cylindrical spindle of the type TA11 (about 25.4 mm diameter, about 35 mm long). Spindle speed used—about 1 mm/s. Distance travelled by spindle—about 10 mm. Ideal range about 60-200 g.

Functionality Tests. The cream substitutes were tested in various food compositions, such as pasta but the disclosure is not limited to pasta.

This test was done in parallel to standard cooking cream for comparison. The cream substitute (about 250 g) and standard cooking cream (about 250 g) were cooked in separate pans for the same time period (about 7-9 minutes) and at the same heat intensity (about 85-95° C.) on a gas stove. Equal quantities of pasta and cut vegetables were added (taking up to about 1 minute to stir in) and the final food composition was evaluated for taste, flavour, coatability, glossiness, creaminess in mouth, and residue left in the pan.

Preferred Spoonable Texture. The desired spoonable cream substitute is able to be spooned off from the container without much resistance, has a clean cut in the container, and slips off the spoon on a very gentle shaking back into the container. It does not leave any dripping or tailing behind while being shaken back into the container.

Overall Rating. Ratings were conducted on a scale of 1 to 5, with 1 being the best liked and 5 being the least liked. This is determined considering all the sensory and functional attributes of the product.

Shelf Life. The shelf life of the cream substitute product was determined to be the span of time during which the product, stored in refrigerated (about 1-4° C.) storage, is microbiologically stable and meets sensory and functionality expectations.

The products were tested monthly for Standard Plate Count (SPC) and for Yeast & Mould (Y & M) growth to evaluate microbiological stability during the shelf life evaluation. Standard Australian test methods AS5013.1 2004 and AS5013.29 2009 were used for SPC and Y & M respectively.

Sensory evaluation was conducted by a panel of four experienced and trained sensory evaluators. A profiling method with a 9-point intensity scale was used to evaluate selected organoleptic characteristics. Panelists were trained for these attributes using anchors for selected attributes. The reference point was marked for each attribute at the start of the sensory evaluation and subsequent monthly evaluations were carried to assess any change against that reference point on the nine point intensity scale. All attributes were discussed at the end of each session and consensus scores were used to determine any changes against that reference. Evaluation was done monthly.

For the functionality evaluation, products including standard regular and light cooking creams were cooked following the recipe and methodology described in the functionality tests above. Products were evaluated for key attributes by a degree of difference test against standard cooking creams. Again, a 9-point scale with a reference (cream) in the middle and scores of ±4 on either side of the scale were used to determine if a particular attribute was less or more than the reference. Evaluation was done monthly and products were tasted by up to 10 evaluators.

Example 1

Regular Cream Substitute

In this Example, cream substitutes were prepared in an attempt to produce a regular cream substitute based on a cheese curd component, and having the consistency of thick cream, which is spoonable. The product was also desired to have stability at elevated cooking temperatures with a shelf life of at least about 180 days. Samples 1 to 5 outline five of the thirty combinations of ingredients tested. Other stabilisers tested either individually or in combination of those described in Samples 1 to 5 include guar gum, gellan gum, alginate and different starches amongst others. Extensive design of the experiment was conducted to evaluate the effect of different stabilisers, different amounts of stabilisers, and combinations of different stabilisers to optimise the final product.

In the preparation of all samples, the water used for hydration was heated at about 65° C. This ensured proper hydration and dispersion of stabilisers and protein powders. The mixing tank was fitted with a high shear device. Other shear devices such as pumps or tanks can also be used. High shear ensured proper mixing and hydration of stabilisers, powders and other ingredients.

In Sample 1, locust bean gum was hydrated for about 10 minutes. Cultured skim milk slurry was then added to the mix. This was followed by the addition of carrageenan to the mix, and then the slurry was mixed for about another 5 minutes. The cultured skim milk slurry was added prior to the addition of carrageenan to provide extra moisture for hydration of the gums. All the remaining ingredients (skim milk powder, whey protein concentrate, salt, starch, gelatine, citric acid and sorbic acid) were added after this step. Cream with about 42% fat was then added at about 70° C., followed by cream cheese curd at about 78° C. The mix was uniformly blended and heated until the composite temperature reached about 65° C. An emulsifier was then added and the product was pasteurised at about 76° C. The moisture and pH can be adjusted if required at this stage. Finished product target pH was about 4.65+/−0.15 and moisture about 66.2+/−1.5 for all products in Example 1. The mix was then homogenised (two stage homogenisation, about 100/50) at about 150-200 bar to achieve the desired smooth, creamy, glossy texture and to facilitate better activation of the stabiliser system. The product was then packed into suitable containers.

In Sample 2, the base formulation was modified to include Quarg and xanthan gum, and other ingredients were adjusted accordingly. Locust bean gum was hydrated for about 10 minutes (using about 65% of the total water used in the experiment). This was followed by the addition of remaining water and about 50% quarg prior to the addition of xanthan gum. Quarg provided the extra moisture for hydration of the gums. The slurry was mixed for about another 5 minutes prior to the addition of the remaining quarg and all other ingredients (skim milk powder, salt, starch, sodium carboxyl methyl cellulose, citric acid and sorbic acid). Cream with about 42% fat was then added at about 70° C., followed by cream cheese curd at about 78° C. The mix was uniformly blended and heated until the composite temperature reached about 65° C. An emulsifier was then added and the product was pasteurised at about 76° C. The moisture and pH can be adjusted if required at this stage. The mix was then homogenised at about 150-200 bar to achieve the desired smooth, creamy, glossy texture and to facilitate better activation of the stabiliser system. The homogenisation was two stage homogenisation. The product was then packed into suitable containers.

In Sample 3, the same formulation and processing conditions were used as in Sample 2 except that about 0.15% gelatine was used.

In Sample 4, a similar base formulation and processing conditions were used as in Sample 2 except that about 0.113% locust bean gum and a combination of about 0.029% of each of carrageenan and xanthan gum was used. They were added one after the other at the second step after about 10 minutes hydration of locust bean gum. Modified starch was also excluded from this formulation and maltodextrin was included to act as a filler instead of modified starch.

Sample 5 is the most optimised formulation, and was arrived at after experimenting with different stabilisers and with the levels of stabilisers used. The processing conditions were the same as in Samples 2 to 4. Locust bean gum (about 0.0959%) and xanthan gum (about 0.0238%) were used. An amount of gelatine was also optimised to about 0.1%. Skim milk powder was excluded and maltodextrin was used as a filler. Carboxymethyl cellulose (CMC) and Panodan were used at about 0.15% levels. The finished product targets for this product were as follows:

|  | Moisture | Fat | Salt | pH |
|---|---|---|---|---|
| Regular dollop | 66.2 ± 1.5% | 23.5 ± 1.5% | 0.75 ± 0.15 | 4.65 ± 0.15 |

Table 2 describes the results of these samples. Sample 1 was a reasonable product but required optimisation in terms of flavour, cooking and spoonability. Sample 2 was a significant improvement on Sample 1 in terms of flavour and cooking performance but required further optimisation for spoonability. In Sample 3, the addition of gelatine improved the spoonability by minimising the tailing/dripping and providing a clean cut while spooning out of the container. Sample 4 demonstrated the importance of modified starch during the cooking. While cooking, Sample 4 did not cling to and coat the pasta and vegetables and, instead, pooled to the bottom of the pan like standard cooking cream. Sample 5 was the best combination of stabilisers that provided an optimal product that delivered against all expectations. Sample 5 had overall rating score of 1 which was based on a combination of results from the sensory and functionality evaluation.

TABLE 1

Samples for regular cream substitutes

| Ingredient, Wt % | Sample No. | | | | |
|---|---|---|---|---|---|
| | 1 | 2 | 3 | 4 | 5 |
| Locust bean gum | 0.1 | 0.137 | 0.137 | 0.113 | 0.0959 |
| Carrageenan | 0.07 | 0 | 0 | 0.029 | 0 |
| Xanthan gum | 0 | 0.0340 | 0.0340 | 0.029 | 0.0238 |
| Water | 13.32 | 16.42 | 16.42 | 16.42 | 16.42 |
| Cultured skim milk slurry | 17.0 | 0 | 0 | 0 | 0 |
| Skim milk powder | 6.0 | 2.5 | 2.5 | 2.65 | 0 |
| Whey protein concentrate | 0.25 | 0 | 0 | 0 | 0 |
| Salt | 0.6 | 0.6 | 0.6 | 0.6 | 0.6 |
| Citric acid | 0.1 | 0.1 | 0.1 | 0.1 | 0.1 |
| Edible gelatine | 0.3 | 0 | 0.15 | 0 | 0.1 |
| Sorbic acid | 0.06 | 0.0664 | 0.0664 | 0.0664 | 0.0664 |
| Modified starch | 0.7 | 0.7 | 0.7 | 0 | 0.7 |
| Cream cheese curd | 16.4 | 13.0 | 13.0 | 13.0 | 13.0 |
| Cream (42%) | 45.0 | 45.0 | 45.0 | 45.0 | 45.0 |
| Quarg | 0 | 21.0 | 21.0 | 21.0 | 22.0 |
| Maltodextrin | 0 | 0 | 0 | 0.7 | 1.6 |
| CMC | 0 | 0.3 | 0.15 | 0.15 | 0.15 |
| Emulsifier | 0.1 | 0.15 | 0.15 | 0.15 | 0.15 |

TABLE 2

Results for regular cream substitutes

|  | Sample 1 | Sample 2 | Sample 3 | Sample 4 | Sample 5 |
|---|---|---|---|---|---|
| Overall preference scale | 4 | 3 | 2 | 5 | 1 |
| Cooking* | Product when added to the pan showed signs of separation, which dissipated when heated. Had too intense a fatty flavor and taste. Coatability and gloss were better than standard cream. Little residue left in pan after serving on plate. | This was an improvement to flavor, taste and coatability over Sample 1. Good coatability of the pasta and vegetables. Very creamy, rich, luscious looking sauce compared with standard cream. No separation/splitting during cooking, and no residue left in pan after serving. | This sample was very similar to Sample 2. Clingable coverage of the pasta and vegetables. Was initially a thicker sauce; it took longer than Sample 2 to thin down in cooking. | Very runny at the start; no thickening or pooling at the bottom of the plate. Sauce did not cling well and tended to pull away from the pasta like an oil in water emulsion. | Nice product. Good thickening, and good coating of the pasta and vegetables. Very creamy and glossy appearance. Taste and flavour were best compared to other samples |

TABLE 2-continued

Results for regular cream substitutes

|  | Sample 1 | Sample 2 | Sample 3 | Sample 4 | Sample 5 |
|---|---|---|---|---|---|
| Spoonability assessment | Easy spoonability but soft body; not a preferred spoonable texture. | Easy to spoon, but long texture and dripping/tailing off the spoon. | Nice, short texture, clean cut and release. | Easy to spoon, but long texture and slight dripping/tailing off the spoon. | Nice clean spoonable texture without much resistance while being spooned from the container, and short texture with no tailing or dripping. |
| Brookfield value | 192 | 1030 | 730 | 1130 | 675 |
| Stevens value | 34 | 77 | 62 | 90 | 70 |

*The cooking evaluation was always done in comparison to standard regular cooking cream. The cream and experimental products were cooked following the procedure described in the test methods. The cooking cream evaluation always indicated that cream did not thicken up significantly over the prescribed cooking time and was visibly runny. The coating slipped off the pasta and tended to pool at the bottom of the plate. There was always residual cream left in the pan. Though the cream did not thicken to the extent of the experimental product even after heating it for extra time. If it was subjected to additional heating, it showed signs of oiling off and curdling after a certain time. This extra heating time also increases the cooking time for the food composition. The final food composition (pasta and vegetables) also had inferior mouthcoat and flavor.

Example 2

Light Cream Substitutes

This Example sets out the details of test compositions that were prepared in an attempt to produce a light cream substitute based on a cheese curd component, and having the consistency of spoonable cream. The product was also desired to have stability at elevated cooking temperatures with a shelf life of at least about 180 days. Samples 6 to 9 outline four of more than forty combinations of ingredients tested. Other stabilisers tested either individually or in combination of those described in Samples 6 to 9 include gellan gum, alginate and different starches amongst others. The experiment was conducted to evaluate the effect of different stabilisers, different amounts of stabilisers, and combinations of different stabilisers to eventually optimise the final product.

Even though most factors in terms of the functionality of different stabilisers tested were applicable to both the regular and light cream substitutes, a unique combination was required for the light cream substitute due to compositional differences (e.g., differences in levels of fat, moisture, etc.) versus the regular cream substitute.

In Sample 6, locust bean gum was hydrated for about 10 minutes (using about 50% of the total water used in the experiment). This was followed by the addition of the remaining water and about 50% quarg prior to addition of guar gum. Quarg provided the extra moisture for hydration of the gums. The slurry was mixed for about another 5 minutes prior to addition of the remaining quarg and all other ingredients (skim milk powder, salt, starch, gelatine, trisodium phosphate, sorbic acid). Cream cheese curd was then added at about 78° C. The mix was uniformly blended and heated until the composite temperature reached about 65° C. An emulsifier was added at this stage and the product was pasteurised at about 76° C. The moisture and pH can be adjusted if required at this stage. The target moisture content for all of Example 2 was about 66.2+/−1.5 and pH target about 4.65+/−0.15. The mix was then homogenised at about 150-200 bar to achieve the desired smooth, creamy, glossy texture and to facilitate better activation of the stabiliser system. The homogenisation was two stage homogenisation. The product was then packed into suitable containers.

In Sample 7, a similar process as Sample 6 was followed except for the exclusion of guar gum and skim milk powder and the inclusion of carrageenan and maltodetxrin. Locust bean gum was hydrated for about 10 minutes (using about 30% of the total water used in the experiment). This was followed by the addition of carrageenan with additional water (about 35% of the total water used for this experiment). The slurry was mixed for about another 5 minutes prior to the addition of the remaining water, quarg and all other ingredients (salt, starch, gelatine, trisodium phosphate, sorbic acid, maltodextrin). Cream cheese curd was then added at about 78° C. The mix was uniformly blended and heated until the composite temperature reached about 65° C. An emulsifier was added at this stage and the product was pasteurised at about 76° C. The moisture and pH can be adjusted if required at this stage. The mix was then homogenised at about 150-200 bar to achieve desired smooth, creamy, glossy texture and to facilitate better activation of stabiliser system. The homogenisation was two stage homogenisation. The product was then packed into suitable containers.

In Sample 8, similar processing conditions as Sample 7 were used. The formulation was modified in that carrageenan was removed and xanthan gum at about 0.019% was used.

Sample 9 used the same processing conditions as Sample 8 except that CMC at about 0.15% was included in the experiment. The finished product targets for Sample 9 were as follows:

|  | Moisture | Fat | Salt | pH |
|---|---|---|---|---|
| Light dollop | 72.2 ± 1.5% | 12.1 ± 1.5% | 0.75 ± 0.15 | 4.65 ± 0.15 |

Table 4 describes the results of these samples. Sample 6 was too thick and was not evaluated further after initial analytical results from Brookfield and Stevens indicated the formulation was unacceptable. Sample 7 was an improvement but still did not have a desirable spoonable texture. Significant work was required for optimisation in terms of flavour, cooking and spoonability. Sample 8 was close to a desired product but lacked the sensory characteristics of an optimal product. The taste and flavour lacked creamy richness and had weak after taste and poor mouthcoating. Cooking performance was acceptable, and was better than standard light cooking creams in terms of coatability, glossiness and residue left in the pan after transferring the pasta onto a plate. Sample 9 was the best combination of stabilisers that provided an optimal product that delivered against all the expectations. Sample 9 had overall rating score of 1 which was based on combination of results from sensory and functionality evaluation.

TABLE 3

Samples for light cream substitutes

| Ingredient, Wt % | Sample 6 | Sample 7 | Sample 8 | Sample 9 |
|---|---|---|---|---|
| Locust bean gum | 0.1 | 0.0747 | 0.0737 | 0.0715 |
| Carrageenan | 0 | 0.0371 | 0 | 0 |
| Xanthan gum | 0 | 0 | 0.019 | 0.018 |
| Guar gum | 0.2 | 0 | 0 | 0 |
| Water | 20.1 | 38.35 | 43.7 | 43.7 |
| Skim milk powder | 2.7 | 0 | 0 | 0 |
| Salt | 0.5 | 0.57 | 0.57 | 0.57 |
| Citric acid | 0.1 | 0 | 0 | 0 |
| Trisodium phosphate | 0 | 0.07 | 0.07 | 0.07 |
| Edible gelatine | 0.3 | 0.18 | 0.3 | 0.15 |
| Sorbic acid | 0.1 | 0.1 | 0.0663 | 0.0663 |
| Modified starch | 0.8 | 0.8 | 0.8 | 0.8 |
| Cream cheese curd | 39.4 | 40.4 | 35.03 | 35.03 |
| Quarg | 35.6 | 13.35 | 10.0 | 10.0 |
| Maltodextrin | 0 | 5.96 | 9.24 | 9.26 |
| CMC | 0 | 0 | 0 | 0.15 |
| Emulsifier | 0.1 | 0.114 | 0.114 | 0.114 |

TABLE 4

Results for light cream substitutes

| | Sample 6 | Sample 7 | Sample 8 | Sample 9 |
|---|---|---|---|---|
| Overall preference scale | 5 | 5 | 3 | 1 |
| Cooking* | No cooking tests were done as this sample was deemed unacceptable. | Thick product, required extensive stirring during the initial stages of heating. Coatability was reasonable but appearance wise not very glossy. | This was an improvement on the previous samples. Good coatability and gloss to the pasta and vegetables but this sample lacked a creamy, lingering after-taste and mouthcoat. No separation/splitting during cooking and not much residue left in pan after serving. | Nice product. Good thickening, and good coating of the pasta and vegetables. Very creamy and glossy appearance. Taste and flavour were best compared to other samples. |
| Spoonability assessment | Product was too firm to be spooned out easily and did not release from the spoon. | Firm product; difficult to be spooned out and released from the spoon. | Easy to spoon off but had soft and runny body. | Good spoonability and release off the spoon. Had the desired short texture with no tailing or dripping. |
| Brookfield value | 7500 | 2400 | 450 | 642 |
| Stevens value | 253 | 236 | 35 | 65 |

*The cooking evaluation was always done in comparison to standard light cooking cream. The cream and experimental products were cooked following the procedure described in the test methods. The cooking cream evaluation always indicated that the cream did not thicken up significantly over the prescribed cooking time and was visibly runny. The coating slipped off the pasta and tended to pool at the bottom of the plate. There was always residual cream left in the pan. Though the cream did not thicken to extent of the experimental product even after heating it for extra time, if it was subjected to additional heating, it showed signs of oiling off and curdling after a certain time. This extra heating time also increases the cooking time for the food composition. The final food composition (pasta and vegetables) also had inferior mouthcoat and flavor.

Evaluation of the shelf life of the samples was carried out to evaluate the performance of the final samples for both the regular and light cream substitutes for microbiological stability, sensory and functionality perspective during the 180 day period.

Results from Standard Plate Count (SPC) and Yeast & Mould (Y & M) tests indicated that the cream substitutes were microbiologically stable during and at the end of the 180 day shelf life period. The results for SPC and Y & M at end of the 180 day shelf life period were within the acceptable limits for dairy products.

TABLE 5

Sensory attributes

| Attribute | Attribute score 1 | Attribute score 9 |
|---|---|---|
| Surface sheen/gloss | Dull | Shiny |
| Evidence of synerisis | None | A lot (teaspoon) |
| Overall Aroma | Weak | Strong |
| Texture-Ease of spoonability | Easy | Difficult |
| Texture-Release from spoon | Easy | Difficult |
| Flavor-Cream | Weak | Strong |
| Flavor-Salt | Weak | Strong |
| Flavor-Cultured/Sour | Weak | Strong |
| Overall flavor strength | Very Mild | Strong |
| Foreign/off flavor | None | Strong |
| Texture in mouth-smooth | Very smooth | Powdery |
| Mouthcoat | Slight | A lot |
| Aftertaste | Weak | Strong |

Sensory evaluation was conducted monthly for attributes listed in Table 5 for the 180 day shelf life period.

Sensory evaluation results for both the regular and light cream substitutes indicated no significant decline in the attributes tested. There was a slight decline in the overall aroma, a decrease in the ease of spoonability and release from the spoon, and a decline in the cultured/sour flavour towards the end of the sixth month for the regular cream substitute but changes were within acceptable tolerance of ±2 from the starting score. Similar changes were also noticed in light cream substitute in addition to an increase in the moist appearance, but again, changes were within the acceptable tolerance of ±2 from the starting score. Both the regular and light cream substitutes were deemed acceptable by the panel of four trained sensory evaluators.

Functionality evaluation was done by comparing cooking performance of the regular and light cream substitutes against standard regular and light cooking creams. The attributes evaluated are listed in Table 6. The regular and light cream substitutes were consistently superior to the standard regular and light cooking creams. In particular, the regular and light cream substitutes did not show any signs of separation, curdling or oiling off during cooking, as compared to the standard regular and light cooking creams. The regular and light cream substitutes easily combined with pasta and vegetables and adhered to the pasta and vegetables compared to the standard creams, which tended to run off the food being cooked. The regular and light cream substitutes also uniformly coated the pasta and vegetables due to their thick creamy texture as compared to the standard creams. There was no or very little residue left at the bottom of the pan after the cream substitutes were transferred from the pan to a serving plate as compared to the significant amount of residue left when cooking with the standard creams. The standard creams also tended to pool at the bottom of the plate after serving. The cream substitutes gave a rich creamy glossy appearance to pasta and vegetables as compared to the standard creams. All product evaluators preferred the pasta and vegetables cooked in the cream substitutes due to their glossy appearance, the rich and creamy mouthfeel, and better flavour profile.

TABLE 6

Functionality evaluation

Attributes tested

Separation during cooking
Splitting/Curdling
Oiling off
Coatability
Combination with ingredients
Pooling to bottom and/or residue left
Appearance-gloss Example 3

Commercial Manufacture of the Products of Samples 5 ("Regular Dollop") and 9 ("Light Dollop")

Figure 1:
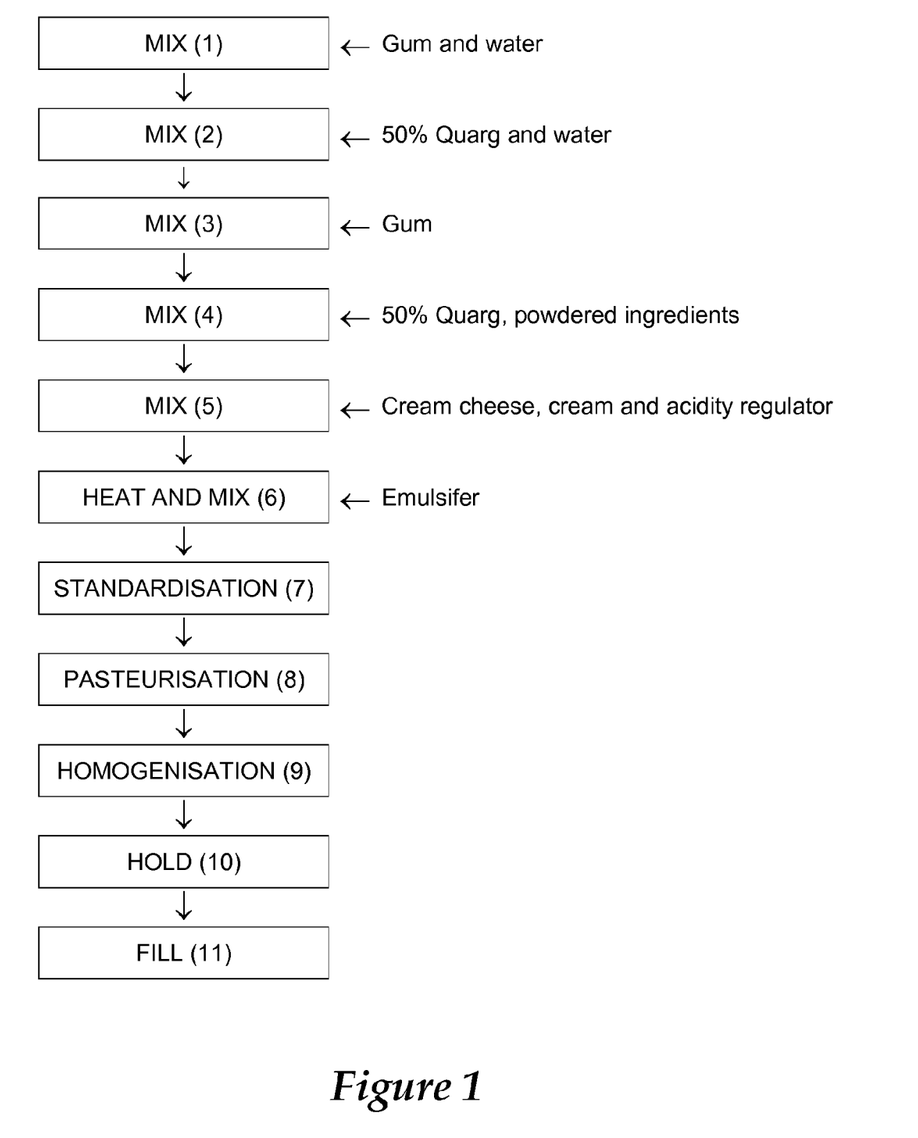
FIG. 1 is a process flow diagram for one embodiment.
Figure 2:
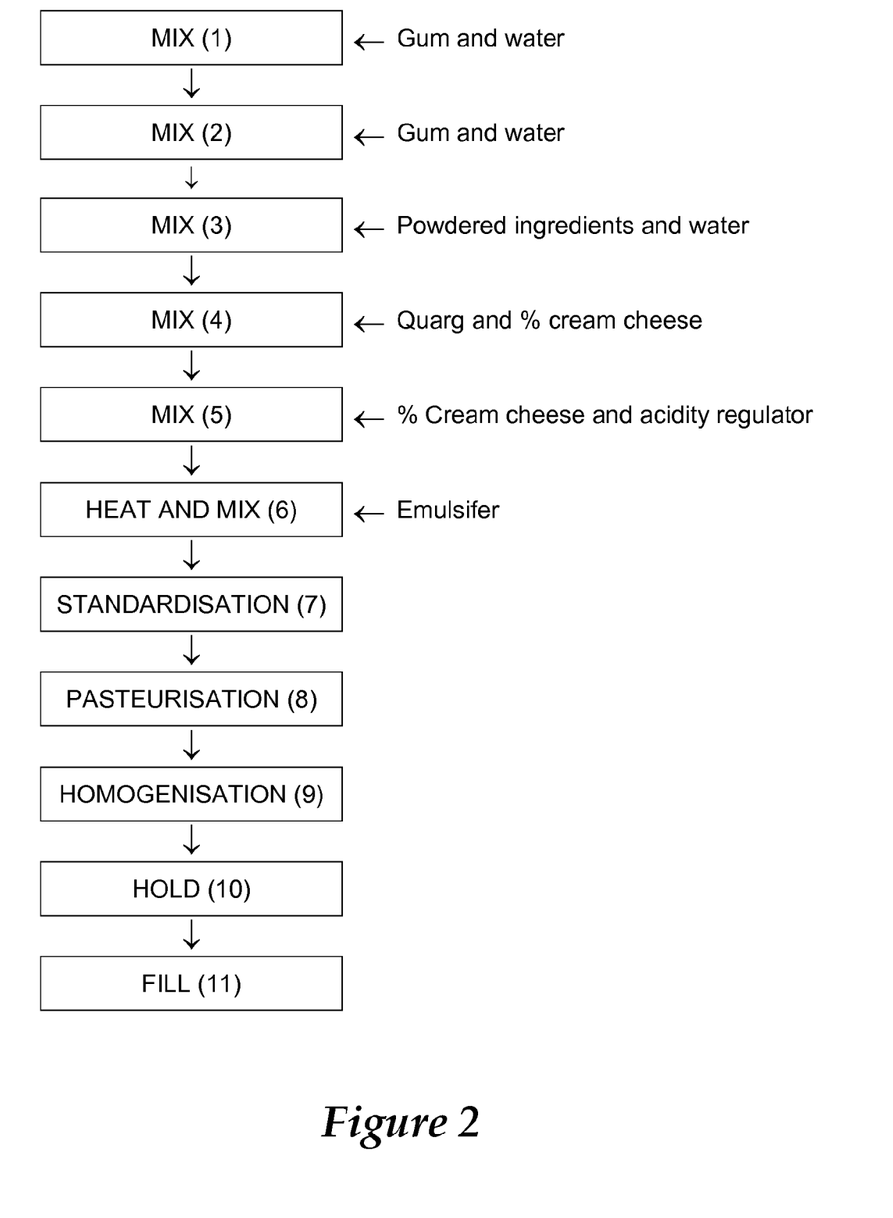
FIG. 2 is a process flow diagram for a second embodiment.

FIGS. 1 and 2 illustrate the processes for producing the desired products of two preferred embodiments, having the same percentage amounts of ingredients of Samples 5 ("regular dollop") and 9 ("light dollop"), scaled up to commercial quantities. FIG. 1 illustrates the process for preparing the regular dollop product, and FIG. 2 the light dollop product.

As illustrated in FIG. 1, gum (specifically the locust bean gum) and about half of the water at around about 65° C. are mixed in mixing stage (1) in an instantiser for a time period of about 10 minutes, with the cutter and agitation on. In mixing stage (2) about 50% of the quarg and the remaining warm water are added and mixed in for about 2 minutes. In mixing stage (3) the second gum (specifically the xanthan gum) is added and mixed for about 5 minutes. In mixing stage (4), the remaining quarg and the powdered ingredients other than the emulsifier are added, being the CMC, gelatine, maltodextrin, salt, etc. Mixing continues for about 5 minutes in this stage. In mixing stage (5), the cream cheese and cream are added and mixed over a time period of about 10 minutes. The cream cheese is added at about 70° C., and mixing continues with agitation. Any acidity regulator required, such as citric acid, is added after cream cheese addition is complete for pH adjustment. In mixing stage (6) the emulsifier is added once the temperature in the instantiser is above about 65° C. and mixing continues for about 2 minutes. In stage (7) standardisation is performed to adjust to the chemical targets, taking up to about 20 minutes. Any remaining water can be added if required. In stage (8) the product is pasteurised, for example, by heating to about 76° C. and holding at this temperature for about 2 minutes. In stage (9) the product is homogenised over about a 30 second time period. The product may then be held in a holding step (10) for any required time period, and then the product is filled into containers in filling step (11).

In FIG. 2, gum (specifically the locust bean gum) and about 25% of the water at around about 65° C. are mixed in mixing stage (1) in an instantiser for a time period of about 10 minutes, with the cutter and agitation on. In mixing stage (2) about 37.5% of the warm water and the second gum (specifically the xanthan gum) are added and mixed in for about 5 minutes. In mixing stage (3) the remaining warm water and powdered ingredients (other than acidity regulator and emulsifier) are added, including the CMC, gelatine, maltodextrin, salt, sorbic acid etc. Mixing continues for about 5 minutes in this stage. In mixing stage (4), some of the cream cheese and all of the quarg is added and mixed in, with heating and agitation. The mixing takes place over about 10 minutes. In mixing stage (5), the remaining cream cheese is added at about 70° C. with agitation, over about 10 minutes. Any acidity regulator required, such as trisodium phosphate, is added after cream cheese addition is complete for pH adjustment. In mixing stage (6) the emulsifier is added once the temperature in the instantiser is above about 65° C., and mixing continues for about 2 minutes. In stage (7) standardisation is performed to adjust to the chemical targets, taking up to about 20 minutes. Any remaining water can be added if required. In stage (8) the product is pasteurised, for example, by heating to about 76° C. and holding at this temperature for about 2 minutes. In stage (9) the product is homogenised over about a 30 second time period. The product may then be held in a holding step (10) for any required time period, and then the product is filled into containers in filling step (11).

The regular dollop and light dollop products withstand simmering at about 85-95° C. for about 20 minutes or more. These products also have the texture of thick cream, fall in a dollop from a spoon and have a viscosity and texture within the preferred limits in the test procedures described above.

It will be understood to persons skilled in the art that many modifications may be made without departing from the spirit and scope as set forth in the specification and claims.

What is claimed is:

1. A cream substitute comprising:
   about 25 to about 55% by weight cheese curd,
   a water source in an amount effective to provide a total moisture content of about 60 to 78%,
   about 0.2% to about 1.5% starch by weight of the cream substitute; and
   about 0.055% to about 0.28% of a combination of hydrated gums, the cheese curd, water source, starch, and hydrated gums included in amounts effective to provide the cream substitute the texture of a thick cream having a firmness value between about 60 g and about 200 g, measured at 5° C. on a Stevens texture analyzer using a cylindrical spindle TA11 at a spindle speed of 1 mm/s and a spindle travel distance of 10 mm.

2. The cream substitute of claim 1, wherein the viscosity of a 600 gram hot sample of the product at 70° C. is between about 300 to about 1800 cps, when measured prior to homogenization during manufacture, based on settings of a 20 rpm speed and spindle 6.

3. The cream substitute of claim 1, wherein the combination of gums comprises locust bean gum and xanthan gum.

4. The cream substitute of claim 1, wherein the cheese curd is selected from one or more of cream cheese, cottage cheese, quarg and soft white cheese.

5. The cream substitute of claim 1, wherein the cream substitute comprises between about 5% and about 50% cream cheese, and between about 5% and about 25% quarg.

6. The cream substitute of claim 1, wherein the cream substitute has a fat content between about 18% to about 28%.

7. The cream substitute of claim 1, wherein the cream substitute has a protein content of about 2.0 to about 6%.

8. The cream substitute of claim 1, wherein the combination of hydrated gums comprises about 0.05% to about 0.2% locust bean gum.

9. The cream substitute of claim 1, wherein the combination of hydrated gums comprises about 0.005% to about 0.08% xanthan gum.

10. The cream substitute of claim 1, wherein the combination of hydrated gums comprises locust bean gum and xanthan gum at a ratio of about 75:25 to about 85:15.

11. A cream substitute comprising:
a cheese curd in an amount of about 25 to about 55% by weight,
a water source in an amount effective to provide a total moisture content of about 60 to 78%,
about 0.05% to about 0.2% hydrated locust bean gum,
about 0.005 to about 0.08% hydrated xanthan gum, and
about 0.2 to about 1.5 percent starch by weight of the cream substitute, the cream substitute having a firmness value between about 60 g and about 200 g, measured at 5° C. on a Stevens texture analyzer using a cylindrical spindle TA11 at a spindle speed of 1 mm/s and a spindle travel distance of 10 mm.

12. A process for the manufacture of a cream substitute, comprising:
combining about 25 to about 55% cheese curd, a water source in an amount effective to provide a total moisture content of about 60 to 78%, about 0.2% to about 1.5% starch, and about 0.055% to about 0.28% hydrated gums to form a mixture,
homogenizing the mixture, and
heating the homogenized mixture at a temperature and for a time sufficient to pasteurize the mixture to form a cream substitute having a firmness value between about 60 g and about 200 g, measured at 5° C. on a Stevens texture analyzer using a cylindrical spindle TA11 at a spindle speed of 1 mm/s and a spindle travel distance of 10 mm.

13. The process of claim 12, wherein the combining step comprises heating at an elevated temperature of between about 40° C. and about 80° C., for a time period of between about 2 and about 40 minutes, and mixing.

14. The process of claim 13, wherein the hydrated gums comprise hydrated locust bean gum and hydrated xanthan gum, and wherein the combining step comprises:
hydrating the locust bean gum with water or the water source,
hydrating and combining the xanthan gum with the hydrated locust bean gum to form a first combination,
combining the first combination with at least one powdered cream substitute ingredient selected from the group consisting of gum, texturizing agent, bulking agent, salt, and preservative to form a second combination,
mixing the second combination with cheese curd at the elevated temperature to form the mixture, and
optionally adding an acidity regulator to the mixture.

15. The process of claim 12, wherein the hydrated gums comprise hydrated locust bean gum and hydrated xanthan gum.

16. The process of claim 15, wherein the combining step comprises:
hydrating the locust bean gum with water or the water source,
hydrating the xanthan gum with water or the water source,
mixing the hydrated locust bean gum and hydrated xanthan gum with the cheese curd at an elevated temperature to form the mixture, and
optionally adding an emulsifier to the mixture at an elevated temperature.

17. The process of claim 12, wherein the cheese curd comprises a first cheese curd component and a second cheese curd component, and wherein the combining step comprises:
hydrating a first gum selected from locust bean gum and xanthan gum with water or the water source,
combining the hydrated first gum with a first cheese curd component,
combining the hydrated first gum and first cheese curd combination with a second gum which is the other of the locust bean gum and the xanthan gum, wherein the second gum is pre-hydrated or is hydrated in situ with the optional addition of water, and
mixing the combination of hydrated gums and cheese curd with (i) a second cheese curd component and (ii) powdered ingredients other than emulsifier and acidity regulator, at an elevated temperature, to form the mixture.

18. The process of claim 17, wherein the method further comprises adding a dairy fat to the mixture.

19. The process of claim 17, wherein the method further comprises adding an acidity regulator to the mixture.

20. The process of claim 17, wherein the method further comprises adding an emulsifier to the mixture.

* * * * *